(12) United States Patent
Yeh

(10) Patent No.: US 11,557,006 B2
(45) Date of Patent: Jan. 17, 2023

(54) METHOD AND SYSTEM FOR CALCULATING TOTAL TRANSMISSION PROBABILITY WITHIN SOCIAL NETWORK BASED ON TIMING

(71) Applicant: NATIONAL TSING HUA UNIVERSITY, Hsinchu (TW)

(72) Inventor: Wei-Chang Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 133 days.

(21) Appl. No.: 17/232,114

(22) Filed: Apr. 15, 2021

(65) Prior Publication Data
US 2022/0164898 A1    May 26, 2022

(30) Foreign Application Priority Data
Nov. 26, 2020   (TW) ................................. 109141645

(51) Int. Cl.
| | |
|---|---|
| *H04L 51/52* | (2022.01) |
| *G06Q 50/00* | (2012.01) |
| *G06F 17/18* | (2006.01) |
| *G06F 16/901* | (2019.01) |
| *H04L 51/18* | (2022.01) |

(52) U.S. Cl.
CPC ......... *G06Q 50/01* (2013.01); *G06F 16/9027* (2019.01); *G06F 17/18* (2013.01); *H04L 51/18* (2013.01); *H04L 51/52* (2022.05)

(58) Field of Classification Search
CPC ......... H04L 51/18; H04L 51/52; G06Q 50/01; G06F 16/9027; G06F 17/18
See application file for complete search history.

(56) References Cited

U.S. PATENT DOCUMENTS

| | | | |
|---|---|---|---|
| 8,543,648 B1 * | 9/2013 | Rhodes | ............... G06F 16/9027 |
| | | | 709/205 |
| 9,848,313 B1 * | 12/2017 | Cottle | ..................... G06F 40/30 |
| 9,967,259 B2 | 5/2018 | Maguire et al. | |

(Continued)

FOREIGN PATENT DOCUMENTS

| | | |
|---|---|---|
| CN | 110335059 A | 10/2019 |
| CN | 110472105 A | 11/2019 |

(Continued)

*Primary Examiner* — Jungwon Chang
(74) *Attorney, Agent, or Firm* — CKC & Partners Co., LLC

(57) ABSTRACT

A method for calculating a total transmission probability within a social network based on timing includes a path probability calculating step, a first binary-addition tree searching step, a second binary-addition tree searching step and a transmission probability calculating step. The path probability calculating step is performed to calculate a plurality of time-path probability matrices from the social network. The first binary-addition tree searching step is performed to enumerate a plurality of feasible spread vectors and a plurality of 1-lag temporal vectors. The second binary-addition tree searching step is performed to enumerate a plurality of time-slot vectors of each of the 1-lag temporal vectors. The transmission probability calculating step is performed to calculate the total transmission probability of the social network. The time-path probability matrices are corresponding to a plurality of time values, and the time values are in the specific time and different from each other.

10 Claims, 5 Drawing Sheets

(56) References Cited

U.S. PATENT DOCUMENTS

| | | | |
|---|---|---|---|
| 10,250,932 | B2 | 4/2019 | Osminer |
| 10,275,009 | B2 | 4/2019 | Vaccari et al. |
| 10,394,303 | B2 | 8/2019 | Vaccari et al. |
| 2016/0299882 | A1* | 10/2016 | Hegerty ................ G06F 40/232 |
| 2016/0299883 | A1* | 10/2016 | Zhu ....................... G06F 40/232 |
| 2017/0317963 | A1* | 11/2017 | Gupta .................... G06N 5/003 |
| 2017/0359292 | A1* | 12/2017 | Aziz ...................... G06Q 50/01 |
| 2021/0105213 | A1* | 4/2021 | Ahmad ................. H04L 1/1887 |
| 2022/0058713 | A1* | 2/2022 | Correa ............... G06Q 30/0633 |

FOREIGN PATENT DOCUMENTS

| | | |
|---|---|---|
| JP | 5882157 B2 | 3/2016 |
| TW | 201520948 A | 6/2015 |
| WO | 2017152883 A1 | 9/2017 |

\* cited by examiner

10

S21

METHOD AND SYSTEM FOR CALCULATING TOTAL TRANSMISSION PROBABILITY WITHIN SOCIAL NETWORK BASED ON TIMING

RELATED APPLICATIONS

This application claims priority to Taiwan Application Serial Number 109141645, filed Nov. 26, 2020, which is herein incorporated by reference.

BACKGROUND

Technical Field

The present disclosure relates to a method and a system for calculating a total transmission probability. More particularly, the present disclosure relates to a method and a system for calculating a total transmission probability within a social network based on timing.

Description of Related Art

Social network is widespread because of the development of the technology. The social network has become a main medium of transmitting message. However, the total transmission probability calculated by the conventional method for calculating total transmission probability has an error compared with the actual values. For example, a transmission probability between each of the nodes in the social network within different time values may be different by the learning effect.

Thus, a method and system for calculating a total transmission probability within social network based on timing are commercially desirable.

SUMMARY

According to one aspect of the present disclosure, a method for calculating a total transmission probability within a social network based on timing is configured to put a message to a source node of a plurality of nodes in the social network and calculate the total transmission probability in a specific time within the social network. The method for calculating the total transmission probability within the social network based on timing includes a path probability calculating step, a first binary-addition tree searching step, a second binary-addition tree searching step and a transmission probability calculating step. The path probability calculating step is performed to calculate a plurality of time-path probability matrices from the social network according to a PageRank algorithm. The first binary-addition tree searching step is performed to enumerate a plurality of feasible spread vectors of the social network and a plurality of 1-lag temporal vectors corresponding to the feasible spread vectors according to a multi-state binary-addition tree searching method. The second binary-addition tree searching step is performed to enumerate a plurality of time-slot vectors of each of the 1-lag temporal vectors according to the multi-state binary-addition tree searching method. The transmission probability calculating step is performed to calculate the total transmission probability of the social network within the specific time according to the time-path probability matrices and the time-slot vectors. The time-path probability matrices are corresponding to a plurality of time values, and the time values are in the specific time and different from each other.

According to another aspect of the present disclosure, a system for calculating a total transmission probability within a social network based on timing is configured to put a message to a source node of a plurality of nodes in the social network. The system for calculating a total transmission probability within the social network based on timing includes a memory and a processor. The memory accesses the social network and a multi-state binary-addition tree searching method. The processor is electrically connected to the memory and is configured to implement a method for calculating the total transmission probability within the social network based on timing. The method for calculating the total transmission probability within the social network based on timing includes a path probability calculating step, a first binary-addition tree searching step, a second binary-addition tree searching step and a transmission probability calculating step. The first binary-addition tree searching step is performed to enumerate a plurality of feasible spread vectors of the social network and a plurality of 1-lag temporal vectors corresponding to the feasible spread vectors according to a multi-state binary-addition tree searching method. The second binary-addition tree searching step is performed to enumerate a plurality of time-slot vectors of each of the 1-lag temporal vectors according to the multi-state binary-addition tree searching method. The transmission probability calculating step is performed to calculate the total transmission probability of the social network within the specific time according to the time-path probability matrices and the time-slot vectors. The time-path probability matrices are corresponding to a plurality of time values, and the time values are in the specific time and different from each other.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
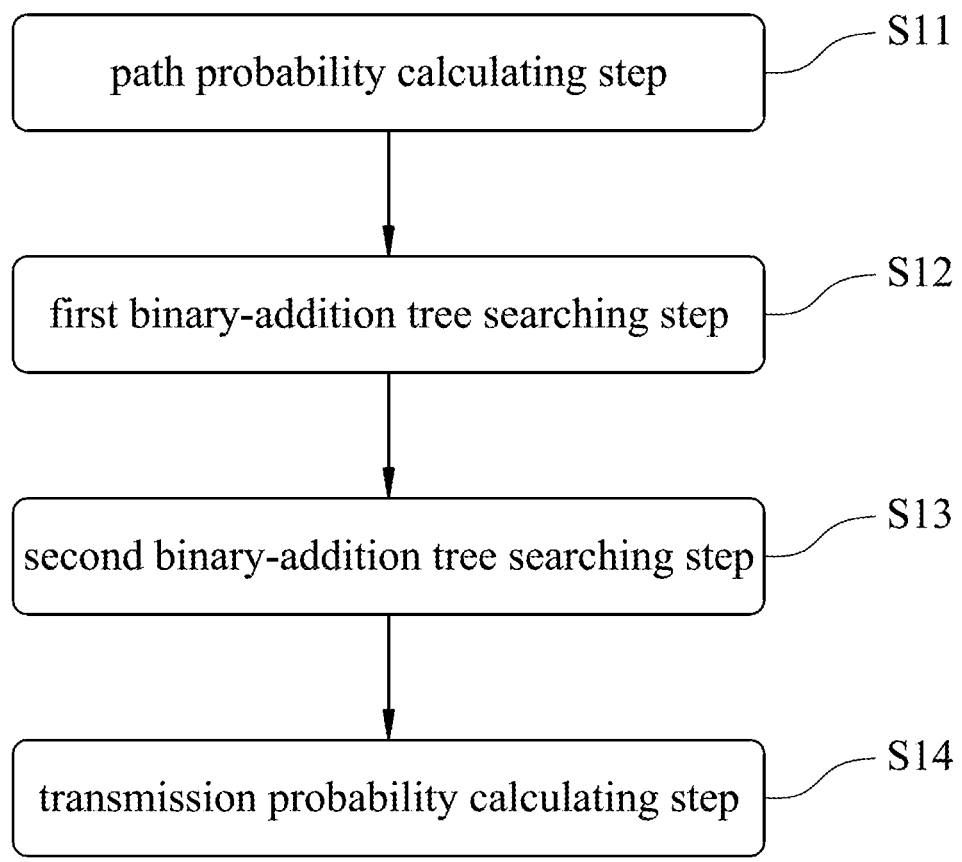
FIG. 1 shows a flow chart of a method for calculating a total transmission probability within a social network based on timing according to a first embodiment of the present disclosure.

Please refer to FIG. 1. FIG. 1 shows a flow chart of a method 100 for calculating a total transmission probability within a social network based on timing according to a first embodiment of the present disclosure. The method 100 for calculating the total transmission probability within the social network based on timing is configured to put a message to a source node of a plurality of nodes in the social network and calculate total the transmission probability in a specific time within the social network. The method 100 for calculating the total transmission probability within the social network based on timing includes a path probability calculating step S11, a first binary-addition tree searching step S12, a second binary-addition tree searching step S13 and a transmission probability calculating step S14.

The path probability calculating step S11 is performed to calculate a plurality of time-path probability matrices from the social network according to a PageRank algorithm. The first binary-addition tree searching step S12 is performed to enumerate a plurality of feasible spread vectors of the social network and a plurality of 1-lag temporal vectors corresponding to the feasible spread vectors according to a multi-state binary-addition tree searching method. The second binary-addition tree searching step S13 is performed to enumerate a plurality of time-slot vectors of each of the 1-lag temporal vectors according to the multi-state binary-addition tree searching method. The transmission probability calculating step S14 is performed to calculate the total transmission probability of the social network within the specific time according to the time-path probability matrices and the time-slot vectors. Thus, the method 100 for calculating the total transmission probability within the social network based on timing takes the timing into consideration and enumerates all the transmission paths to make the calculating result of the total transmission probability approach the real condition. Each of the steps of the method 100 for calculating the total transmission probability within the social network based on timing is described in more detail below.

Figure 2:
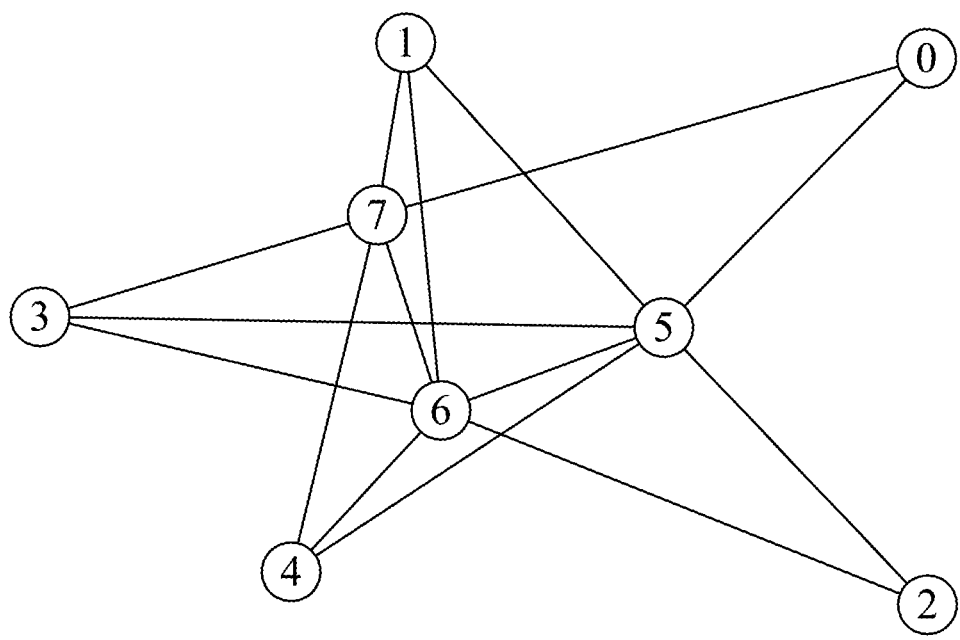
FIG. 2 shows a schematic view of a social network based on timing according to a second embodiment of the present disclosure.

Please refer to FIG. 2. FIG. 2 shows a schematic view of social network 10 based on timing according to a second embodiment of the present disclosure. The social network 10 includes the nodes 0, 1, 2, 3, 4, 5, 6, 7 and a plurality of paths. The nodes 0-7 includes a source node, and each of the node i (0-7) includes a degree (Deg). Each of the paths is connected to two of the nodes i. The degree Deg(i) of each of the nodes i is a number of the paths connected to each of the nodes i. The social network 10 is a scale-free network.

Figure 3:
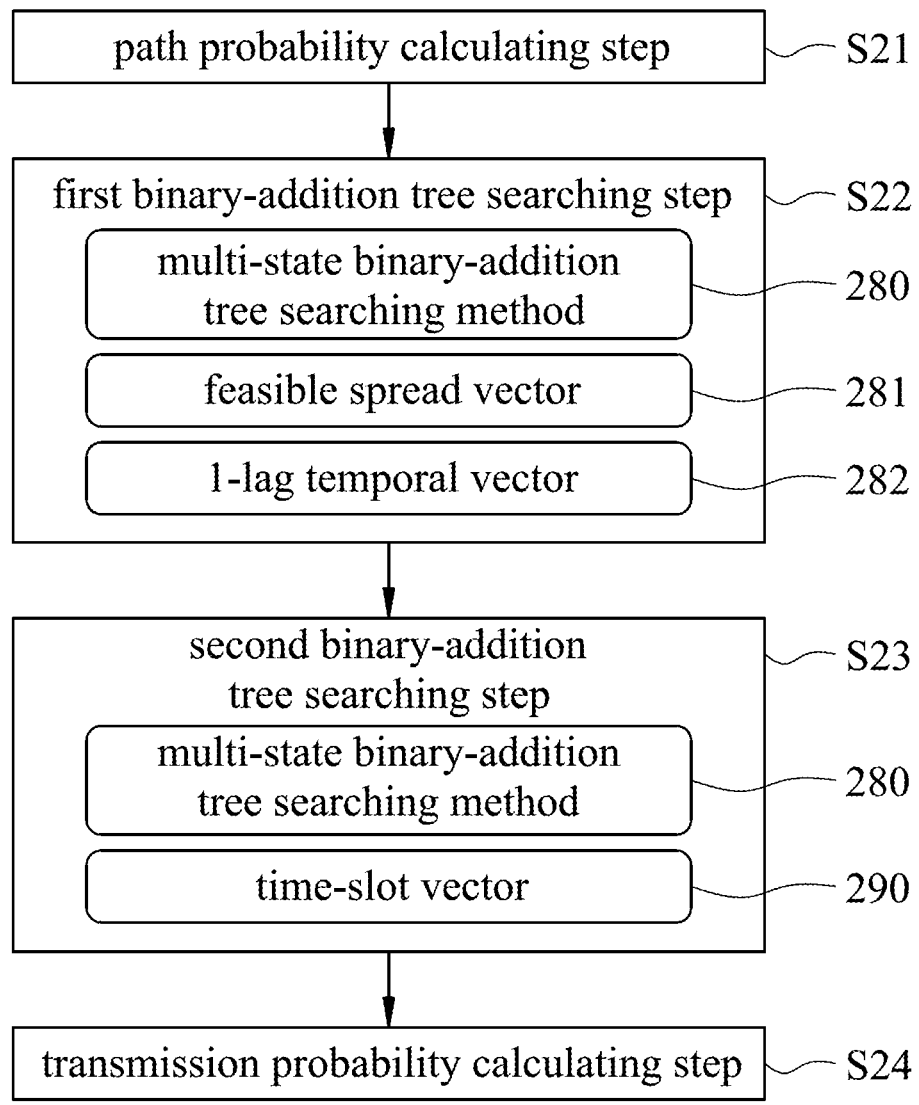
FIG. 3 shows a flow chart of a method for calculating a total transmission probability within the social network based on timing of FIG. 2.
Figure 4:
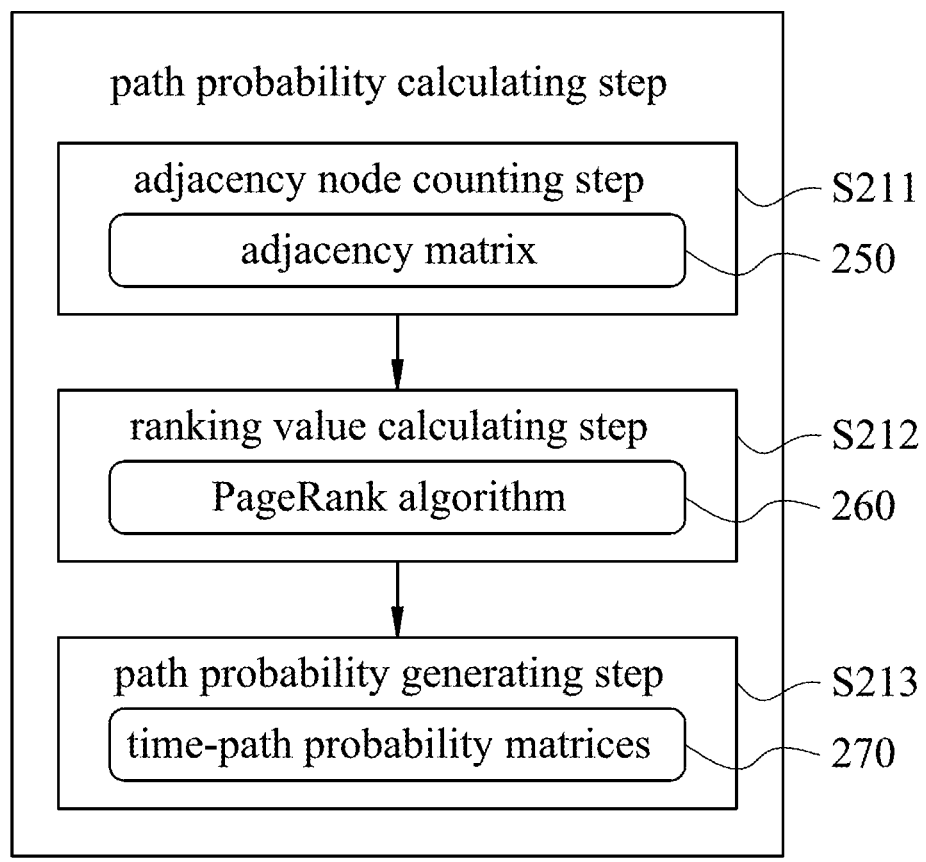
FIG. 4 shows a path probability calculating step of the method for calculating the total transmission probability within the social network based on timing of FIG. 3.

Please refer to FIG. 2, FIG. 3 and FIG. 4. FIG. 3 shows a flow chart of a method 200 for calculating a total transmission probability within the social network based on timing of FIG. 2. FIG. 4 shows a path probability calculating step S21 of the method 200 for calculating the total transmission probability within the social network based on timing of FIG. 3. The method 200 for calculating the total transmission probability within the social network includes the path probability calculating step S21, a first binary-addition tree searching step S22, a second binary-addition tree searching step S23 and a transmission probability calculating step S24.

The path probability calculating step S21 is performed to calculate a plurality of time-path probability matrices 270 from the social network 10 according to a PageRank algorithm 260. The path probability calculating step S21 includes an adjacency node counting step S211, a ranking value calculating step S212 and a path probability generating step S213.

Please refer to Table 1. The adjacency node counting step S211 is performed to count the paths connected to the nodes i and generates an adjacency matrix 250 of each of the nodes i. In detail, the adjacency node counting step S211 shows the connection between two of the nodes i in the social network 10 by the adjacency matrix 250, and the adjacency matrix 250 is listed in the Table 1. "1" represents that the two of the nodes i are connected between a path, "-" represents that the two of the nodes are disconnected. Deg(i) represents the degree of each of the nodes i.

TABLE 1

| i | 0 | 1 | 2 | 3 | 4 | 5 | 6 | 7 |
|---|---|---|---|---|---|---|---|---|
| 0 | — | — | — | — | — | 1 | — | 1 |
| 1 | — | — | — | — | — | 1 | 1 | 1 |
| 2 | — | — | — | — | — | 1 | 1 | — |
| 3 | — | — | — | — | — | 1 | 1 | 1 |
| 4 | — | — | — | — | — | 1 | 1 | 1 |
| 5 | 1 | 1 | 1 | 1 | 1 | — | 1 | — |
| 6 | — | 1 | 1 | 1 | 1 | 1 | — | 1 |
| 7 | 1 | 1 | — | 1 | 1 | — | 1 | — |
| Deg(i) | 2 | 3 | 2 | 3 | 3 | 6 | 6 | 5 |

Please refer to Table 2 and Table 3. The ranking value calculating step S212 is performed to calculate a ranking value PR(i) of each of the nodes i according to the PageRank algorithm 260, the degree Deg(i) and a damping factor d, and stores the ranking value PR(i) of each of the nodes i into the ranking matrices. Moreover, the PageRank algorithm 260 is satisfied by a formula (1).

$$PR = [dM + (1-d)/N_{node} \cdot 1] \cdot PR \qquad (1).$$

Wherein M is a normalized adjacency matrix of an adjacency matrix 250, as listed in Table 2, d is a damping factor between 0 and 1, $N_{node}$ is a number of the nodes i, and I is an identity matrix. The degree Deg(i), the adjacency node set V(i) and the ranking value PR(i) of each of the nodes i of the social network 10 are listed in Table 3. The adjacency node set V(i) of each of the nodes i is transformed from the adjacency matrix 250. The adjacency node set V(i) represents other nodes i which are connected to the node i via the path. In Table 3, V(0)={5,7}. The node 5 and the node 7 are both connected to the node 0 via the paths, and the degree Deg(i) of the node i increases as the ranking value PR(i) increases.

TABLE 2

| i | 0 | 1 | 2 | 3 | 4 | 5 | 6 | 7 |
|---|---|---|---|---|---|---|---|---|
| 0 | — | — | — | — | — | 1/6 | — | 1/5 |
| 1 | — | — | — | — | — | 1/6 | 1/6 | 1/5 |
| 2 | — | — | — | — | — | 1/6 | 1/6 | — |
| 3 | — | — | — | — | — | 1/6 | 1/6 | 1/5 |
| 4 | — | — | — | — | — | 1/6 | 1/6 | 1/5 |
| 5 | 1/2 | 1/3 | 1/2 | 1/3 | 1/3 | — | 1/6 | — |

TABLE 2-continued

| i | 0 | 1 | 2 | 3 | 4 | 5 | 6 | 7 |
|---|---|---|---|---|---|---|---|---|
| 6 | — | 1/3 | 1/2 | 1/3 | 1/3 | 1/6 | — | 1/5 |
| 7 | 1/2 | 1/3 | — | 1/3 | 1/3 | — | 1/6 | — |

TABLE 3

| i | Deg(i) | V(i) | PR(i) |
|---|---|---|---|
| 0 | 2 | {5, 7} | 0.117460 |
| 1 | 3 | {5, 6, 7} | 0.119714 |
| 2 | 2 | {5, 6} | 0.117062 |
| 3 | 3 | {5, 6, 7} | 0.119714 |
| 4 | 3 | {5, 6, 7} | 0.119714 |
| 5 | 6 | {0, 1, 2, 3, 4, 6} | 0.138452 |
| 6 | 6 | {1, 2, 3, 4, 5, 7} | 0.135284 |
| 7 | 5 | {0, 1, 3, 4, 6} | 0.132599 |

The path probability generating step S213 is performed to generate the time-path probability matrices 270 according to the ranking value PR(i) of each of the nodes i and an adjacency node set V(i) of each of the nodes i. The time-path probability matrices 270 are corresponding to a plurality of time values t, and the time values t are in the specific time and different to each other. The calculating method of the time-path probability is satisfied by a formula (2), a formula (3) and a formula (4).

$$p_{i,j} = \frac{PR(j)}{\sum_{k \in V(i)} PR(k)}. \quad (2)$$

$$p_{0,5} = \frac{PR(5)}{PR(5) + PR(7)} = \frac{0.138452}{0.138452 + 0.132599} = 0.510797. \quad (3)$$

$$p_{i,j,t} = \frac{p_{i,j,t-1}}{(t+1)^\alpha}. \quad (4)$$

Wherein the formula (2) is configured to calculate the transmission probability when the time value t=0, $p_{i,j}$ is a probability of a path connected between the node i and the node j, $$\sum_{k \in V(i)} PR(k)$$

is a sum of the ranking value PR of all the nodes of the adjacency node set V(i) of the node i. The formula (3) is configured to calculate the probability ($p_{0,5}$) of the path connected between the node 0 and the node 5. The formula (4) is configured to calculate the probability ($p_{i,j}$) of the path connected between the node i and the node j when the time value t>0. α is a learning rate, and a is predetermined into 0.35. In detail, the path probability generating step S213 calculates the transmission probability of all the paths of the time values t, and generates the time-path probability matrices 270 corresponding to different time values t. The time-path probability matrix 270 in the time value t=0 is listed in Table 4. The time-path probability matrix 270 in the time value t=1 is listed in Table 5. The time-path probability matrix 270 in the time value t=2 is listed in Table 6.

TABLE 4

| i | 0 | 1 | 2 | 3 | 4 | 5 | 6 | 7 |
|---|---|---|---|---|---|---|---|---|
| 0 | — | — | — | — | — | 0.51 | — | 0.49 |
| 1 | — | — | — | — | — | 0.34 | 0.33 | 0.32 |
| 2 | — | — | — | — | — | 0.50 | 0.49 | — |
| 3 | — | — | — | — | — | 0.34 | 0.33 | 0.32 |
| 4 | — | — | — | — | — | 0.34 | 0.33 | 0.32 |
| 5 | 0.16 | 0.16 | 0.16 | 0.16 | 0.16 | — | 0.18 | — |
| 6 | — | 0.16 | 0.15 | 0.16 | 0.16 | 0.18 | — | 0.17 |
| 7 | 0.19 | 0.19 | — | 0.19 | 0.19 | — | 0.22 | — |

TABLE 5

| i | 0 | 1 | 2 | 3 | 4 | 5 | 6 | 7 |
|---|---|---|---|---|---|---|---|---|
| 0 | — | — | — | — | — | 0.40 | — | 0.38 |
| 1 | — | — | — | — | — | 0.26 | 0.26 | 0.25 |
| 2 | — | — | — | — | — | 0.39 | 0.38 | — |
| 3 | — | — | — | — | — | 0.26 | 0.26 | 0.25 |
| 4 | — | — | — | — | — | 0.26 | 0.26 | 0.25 |
| 5 | 0.12 | 0.12 | 0.12 | 0.12 | 0.12 | — | 0.14 | — |
| 6 | — | 0.12 | 0.12 | 0.12 | 0.12 | 0.14 | — | 0.13 |
| 7 | 0.15 | 0.15 | — | 0.15 | 0.15 | — | 0.17 | — |

TABLE 6

| i | 0 | 1 | 2 | 3 | 4 | 5 | 6 | 7 |
|---|---|---|---|---|---|---|---|---|
| 0 | — | — | — | — | — | 0.27 | — | 0.26 |
| 1 | — | — | — | — | — | 0.18 | 0.17 | 0.17 |
| 2 | — | — | — | — | — | 0.27 | 0.26 | — |
| 3 | — | — | — | — | — | 0.18 | 0.17 | 0.17 |
| 4 | — | — | — | — | — | 0.18 | 0.17 | 0.17 |
| 5 | 0.08 | 0.08 | 0.08 | 0.08 | 0.08 | — | 0.09 | — |
| 6 | — | 0.08 | 0.08 | 0.08 | 0.08 | 0.09 | — | 0.09 |
| 7 | 0.10 | 0.10 | — | 0.10 | 0.10 | — | 0.11 | — |

The first binary-addition tree searching step S22 is performed to enumerate a plurality of feasible spread vectors 281 of the social network 10 and a plurality of 1-lag temporal vectors 282 corresponding to the feasible spread vectors 281 according to a multi-state binary-addition tree searching method 280. Each of the feasible spread vectors 281 includes an adjacency node set V(i) corresponding to the node i, each of the 1-lag temporal vectors 282 is corresponding to one of the time values t of each of the feasible spread vectors 281, and each of the feasible spread vectors 281 and the 1-lag temporal vectors 282 has a state vector corresponded thereto.

The first binary-addition tree searching step S22 enumerates all the possibility of the source node according to the connection between two of the nodes i of the social network 10, that is, the adjacency node set V(0)-V(7) of each of the nodes 0-7. Table 7 lists the first feasible spread vector 281 to the tenth feasible spread vector 281 and the 1-lag temporal vectors 282 corresponding to each of the first feasible spread vector 281 to the tenth feasible spread vector 281, and the source node is the node 0. The feasible spread vector 281 represents the source node of the node 0 to the node 7 from left to right sequentially. The first feasible spread vector (5,5,5,5,5,0,1,1) represents the node 0 spreads to the node 5, the node 5 spreads to the nodes 1, 2, 3, 4, and the node 1 spreads to the node 6, 7, that is, the source node of the nodes 1, 2, 3, 4 is the node 5, the source node of the node 5 is node 0, and the source node of the node 6, 7 is the node 1. The 1-lag temporal vector 282 represents the time value t of the node 0 to the node 7 when the nodes 0-7 are spread from left to right sequentially. The first number 0 of the first 1-lag temporal vector 282 (0,2,2,2,2,1,3,3) represents the source node, and the first 1-lag temporal vector 282 (0,2,2,2,2,1,3,3) represents the message is spread to the node 5 when the time value t=1, the message is spread to the nodes 1, 2, 3, 4 when the time value t=2, and the message is spread to the nodes 6, 7 when the time value t=3.

TABLE 7

| | feasible spread vector 281 | 1-lag temporal vector 282 |
|---|---|---|
| 1 | (5, 5, 5, 5, 5, 0, 1, 1) | (0, 2, 2, 2, 2, 1, 3, 3) |
| 2 | (5, 5, 5, 5, 5, 0, 1, 3) | (0, 2, 2, 2, 2, 1, 3, 3) |
| 3 | (5, 5, 5, 5, 5, 0, 1, 4) | (0, 2, 2, 2, 2, 1, 3, 3) |
| 4 | (5, 5, 5, 5, 5, 0, 1, 6) | (0, 2, 2, 2, 2, 1, 3, 4) |
| 5 | (5, 5, 5, 5, 5, 0, 2, 0) | (0, 2, 2, 2, 2, 1, 3, 1) |
| 6 | (5, 5, 5, 5, 5, 0, 2, 1) | (0, 2, 2, 2, 2, 1, 3, 3) |
| 7 | (5, 5, 5, 5, 5, 0, 2, 3) | (0, 2, 2, 2, 2, 1, 3, 3) |
| 8 | (5, 5, 5, 5, 5, 0, 2, 4) | (0, 2, 2, 2, 2, 1, 3, 3) |
| 9 | (5, 5, 5, 5, 5, 0, 2, 6) | (0, 2, 2, 2, 2, 1, 3, 4) |
| 10 | (5, 5, 5, 5, 5, 0, 3, 0) | (0, 2, 2, 2, 2, 1, 3, 1) |

The second binary-addition tree searching step S23 is performed to enumerate a plurality of time-slot vectors 290 of each of the 1-lag temporal vectors 282 according to the multi-state binary-addition tree searching method 280. In other words, the second binary-addition tree searching step S23 utilizes the multi-state binary-addition tree searching method 280 to enumerate all the possible time-slot vectors 290 of each of the 1-lag temporal vectors 282 obtained by the first binary-addition tree searching step S22. The first time-slot vector to the thirtieth time-slot vector of the time-slot vectors 290 of the 1-lag temporal vector (0,2,2,2,2,1,3,3) enumerated by the multi-state binary-addition tree searching method 280 are listed in Table 8.

TABLE 8

| | time-slot vector 290 | | time-slot vector 290 |
|---|---|---|---|
| 1 | (0, 0, 0, 0, 0, 0, 0, 1) | 16 | (0, 0, 0, 0, 1, 0, 1, 1) |
| 2 | (0, 0, 0, 0, 0, 0, 0, 2) | 17 | (0, 0, 0, 0, 1, 0, 1, 2) |
| 3 | (0, 0, 0, 0, 0, 0, 0, 3) | 18 | (0, 0, 0, 0, 1, 0, 1, 3) |
| 4 | (0, 0, 0, 0, 0, 0, 1, 0) | 19 | (0, 0, 0, 0, 1, 0, 2, 1) |
| 5 | (0, 0, 0, 0, 0, 0, 1, 1) | 20 | (0, 0, 0, 0, 1, 0, 2, 2) |
| 6 | (0, 0, 0, 0, 0, 0, 1, 2) | 21 | (0, 0, 0, 0, 1, 0, 2, 3) |
| 7 | (0, 0, 0, 0, 0, 0, 1, 3) | 22 | (0, 0, 0, 0, 1, 0, 3, 1) |
| 8 | (0, 0, 0, 0, 0, 0, 2, 0) | 23 | (0, 0, 0, 0, 1, 0, 3, 2) |
| 9 | (0, 0, 0, 0, 0, 0, 2, 1) | 24 | (0, 0, 0, 0, 1, 0, 3, 3) |
| 10 | (0, 0, 0, 0, 0, 0, 2, 2) | 25 | (0, 0, 0, 0, 2, 0, 2, 2) |
| 11 | (0, 0, 0, 0, 0, 0, 2, 3) | 26 | (0, 0, 0, 0, 2, 0, 2, 3) |
| 12 | (0, 0, 0, 0, 0, 0, 3, 0) | 27 | (0, 0, 0, 0, 2, 0, 3, 2) |
| 13 | (0, 0, 0, 0, 0, 0, 3, 1) | 28 | (0, 0, 0, 0, 2, 0, 3, 3) |
| 14 | (0, 0, 0, 0, 0, 0, 3, 2) | 29 | (0, 0, 0, 1, 0, 0, 1, 1) |
| 15 | (0, 0, 0, 0, 0, 0, 3, 3) | 30 | (0, 0, 0, 1, 0, 0, 1, 2) |

The transmission probability calculating step S24 is performed to calculate the total transmission probability S of the social network 10 within the specific time according to the time-path probability matrices 270 and the time-slot vectors 290. Moreover, The transmission probability calculating step S24 calculates the transmission probability which is corresponding to each of the time-slot vectors 290 according to the time-slot vectors 290, and sets each of the nodes 0-7 as a source node to calculates the total transmission probability S corresponding to different damping factors d and different time values t. Table 9 lists the transmission probability corresponding to the first time-slot vector 290 to the thirtieth time-slot vector 290 in Table 8. Ti represents a sequence number of the time-slot vectors 290. Pr(Ti) represents the transmission probability corresponding to each of the time-slot vectors 290. Table 10 lists the total transmission probability S corresponding to different damping factor d in a specific time (the time value t=0) by putting a message to the node i as a source node in the social network 10.

TABLE 9

| Ti | Pr(Ti) | Ti | Pr(Ti) | Ti | Pr(Ti) |
|---|---|---|---|---|---|
| 1 | 4.08E−09 | 11 | 8.68E−09 | 21 | 9.41E−09 |
| 2 | 4.72E−09 | 12 | 9.00E−09 | 22 | 9.42E−09 |
| 3 | 5.04E−09 | 13 | 9.16E−09 | 23 | 9.43E−09 |
| 4 | 6.38E−09 | 14 | 9.23E−09 | 24 | 9.43E09 |
| 5 | 7.02E−09 | 15 | 9.27E−09 | 25 | 9.44E−09 |
| 6 | 7.33E−09 | 16 | 9.33E−09 | 26 | 9.44E−09 |
| 7 | 7.49E−09 | 17 | 9.35E−09 | 27 | 9.44E−09 |
| 8 | 8.14E−09 | 18 | 9.37E−09 | 28 | 9.44E−09 |
| 9 | 8.45E−09 | 19 | 9.39E−09 | 29 | 9.49−09 |
| 10 | 8.60E−09 | 20 | 9.40E−09 | 30 | 9.52E−09 |

TABLE 10

| i | d = 0.1 | d = 0.3 | d = 0.5 | d = 0.7 | d = 0.9 |
|---|---|---|---|---|---|
| 0 | 1.05E−05 | 7.55E−06 | 5.56E−06 | 4.17E−06 | 3.15E−06 |
| 1 | 1.78E−05 | 1.33E−05 | 1.07E−05 | 8.79E−06 | 7.43E−06 |
| 2 | 1.11E−05 | 8.15E−06 | 6.14E−06 | 4.72E−06 | 3.67E−06 |
| 3 | 1.78E−05 | 1.35E−05 | 1.07E−05 | 8.79E−06 | 7.43E−06 |
| 4 | 1.78E−05 | 1.35E−05 | 1.07E−05 | 8.79E−06 | 7.43E−06 |
| 5 | 4.71E−06 | 3.32E−06 | 2.50E−06 | 1.99E−06 | 1.64E−06 |
| 6 | 7.87E−06 | 5.76E−06 | 4.35E−06 | 3.37E−06 | 2.67E−06 |
| 7 | 8.07E−06 | 6.26E−06 | 5.03E−06 | 4.17E−06 | 3.54E−06 |
| S | 9.58E−05 | 7.16E−05 | 5.57E−05 | 4.48E−05 | 3.70E−05 |

Therefore, the method 200 for calculating the total transmission probability within the social network based on timing takes the timing into consideration and enumerates all the transmission paths according to the multi-state binary-addition tree searching method 280 to make the calculating result of the total transmission probability approach the real condition.

Figure 5:
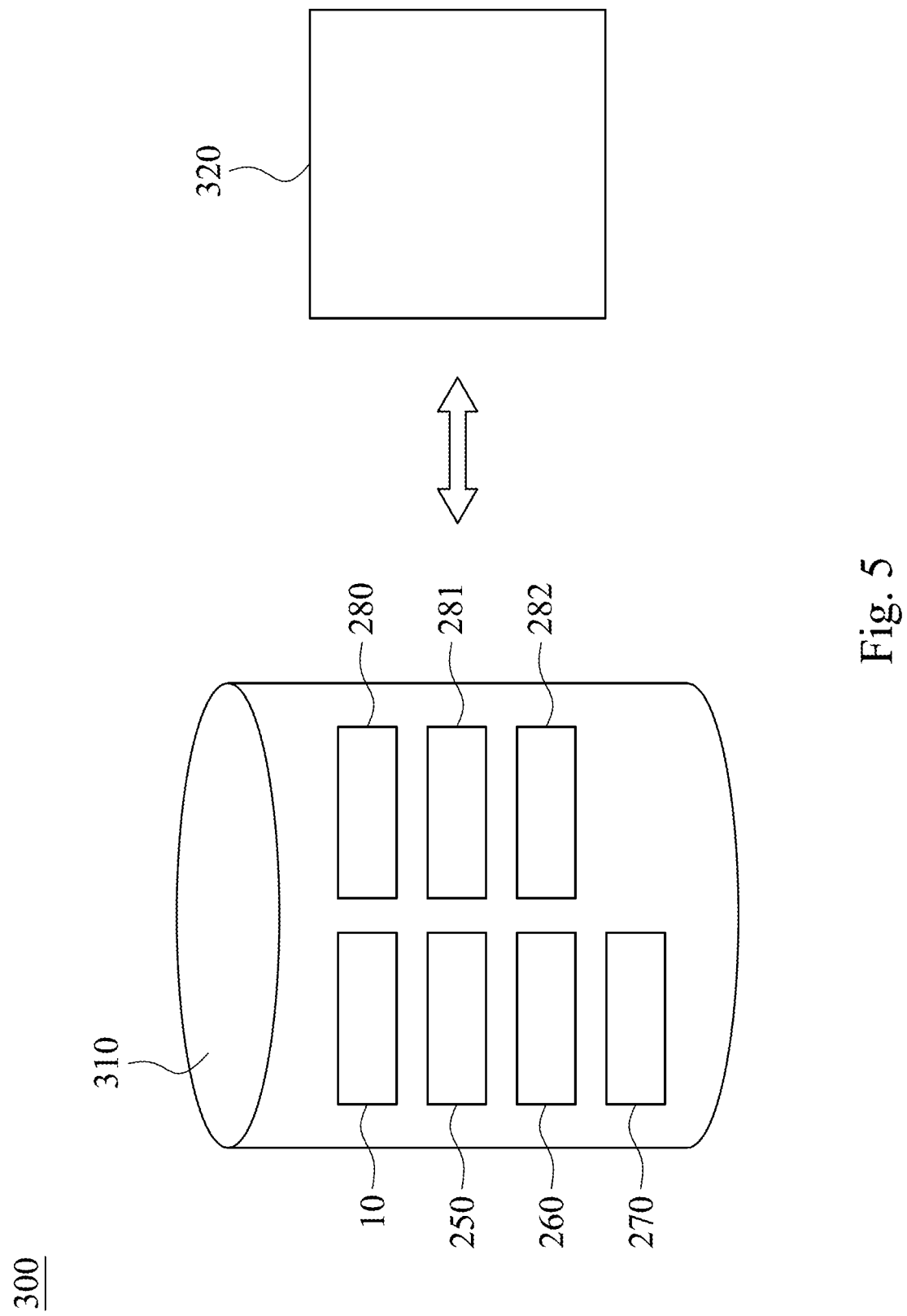
FIG. 5 shows a block diagram of a system for calculating a total transmission probability within a social network based on timing according to a third embodiment of the present disclosure.

Please refer to FIG. 1 to FIG. 5, wherein FIG. 5 shows a block diagram of a system 300 for calculating a total transmission probability within a social network based on timing according to a third embodiment of the present disclosure. The system 300 for calculating the total transmission probability within the social network based on timing includes a memory 310 and a processor 320.

The memory 310 accesses the social network 10, the adjacency matrix 250, the PageRank algorithm 260, the time-path probability matrices 270, the multi-state binary-addition tree searching method 280, the feasible spread vector 281, the 1-lag temporal vector 282 and the time-slot vector 290.

The processor 320 is electrically connected to the memory 310. The processor 320 is configured to implement the method for calculating the total transmission probability within the social network based on timing. The method for calculating the total transmission probability within the social network based on timing includes a path probability calculating step S21, a first binary-addition tree searching step S22, a second binary-addition tree searching step S23 and a transmission probability calculating step S24. The path probability calculating step S21 includes an adjacency node counting step S211, a ranking value calculating step S212 and a path probability generating step S213. The processor 320 can be a micro-processor, a central processing unit (CPU), a server processor or other electrical processing unit, but the present disclosure is not limited thereto.

Please refer to Table 11. Table 11 lists a number of the feasible spread vectors 281 enumerated by the multi-state binary-addition tree searching method 280 of the system 300 for calculating the total transmission probability within the social network based on timing. The system 300 sets the node i as a source node. The processor 320 is a notebook Intel Core i7 central processor, installed a Windows 10 operating system and run on Spyder. The memory 310 is a 16 GB random access memory (RAM). Wherein i represents the nodes 0-7, Deg(i) represents the degree, Tmax represents the computing time, N represents a number of the feasible spread vector 281 generated by the multi-state binary-addition tree searching method 280, and n represents a number of the feasible spread vector 281. In Table 11, the number of the degree Deg(i) increases, the number of the feasible spread vectors 281 and the runtime of the processor 320 decreases.

TABLE 11

| i | Deg(i) | Tmax | N | n |
|---|--------|------|------|------|
| 0 | 2 | 6 | 9720 | 1268 |
| 1 | 3 | 6 | 6480 | 1269 |
| 2 | 4 | 6 | 9720 | 1269 |
| 3 | 3 | 6 | 6480 | 1269 |
| 4 | 3 | 6 | 6480 | 1269 |
| 5 | 6 | 5 | 3240 | 1268 |
| 6 | 6 | 5 | 3240 | 1269 |
| 7 | 5 | 5 | 3888 | 1269 |

Please refer to Table 12 and Table 13. i represents the nodes 0-7, t represents the time values, N represents a number of the feasible spread vectors 281 generated according to the multi-state binary-addition tree searching method 280, and n represents a number of the feasible spread vectors 281 which are practical. Table 12 and Table 13 list the number N of the feasible spread vectors 281 and the number n of the practical feasible spread vectors 281 when the time value t=2 and the time value t=3, respectively. In Table 12 and Table 13, if the time value t increases, the rate (N/n) of the number N of all the feasible spread vectors 281 and the number n of the practical feasible spread vectors 281 also increases.

TABLE 12

| i | N | n | N/n |
|---|----------|--------|--------|
| 0 | 11651837 | 891932 | 13.064 |
| 1 | 9196660  | 761060 | 12.084 |
| 2 | 11303860 | 874525 | 12.926 |
| 3 | 9196660  | 761060 | 12.084 |
| 4 | 9196660  | 761060 | 12.084 |
| 5 | 3783941  | 461678 | 8.196  |
| 6 | 4434892  | 507651 | 8.736  |
| 7 | 5354260  | 597341 | 8.963  |

TABLE 13

| i | N | n | N/n |
|---|-----------|----------|--------|
| 0 | 514419858 | 24700821 | 20.826 |
| 1 | 396940282 | 20584520 | 19.283 |
| 2 | 496287202 | 24131654 | 20.566 |
| 3 | 396940282 | 20584520 | 19.283 |
| 4 | 396940282 | 20584520 | 19.283 |
| 5 | 142973828 | 11344701 | 12.603 |
| 6 | 173501602 | 12759040 | 13.598 |
| 7 | 212317522 | 15380446 | 13.804 |

Thus, the system 300 for calculating the total transmission probability within the social network based on timing takes the timing into consideration and enumerates all the transmission paths according to the multi-state binary-addition tree searching method 280 to make the calculating result of the transmission probability approach the real condition.

According to the aforementioned embodiments and examples, the advantages of the present disclosure are described as follows.

1. The method for calculating the total transmission probability within the social network based on timing takes the timing into consideration and enumerates all the transmission paths according to the multi-state binary-addition tree searching method to make the calculating result of the total transmission probability approach the real condition.

2. The system for calculating the total transmission probability within the social network based on timing takes the timing into consideration and enumerates all the transmission paths according to the multi-state binary-addition tree searching method to make the calculating result of the total transmission probability approach the real condition.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for calculating a total transmission probability within a social network based on timing, which is configured to put a message to a source node of a plurality of nodes in the social network and calculate the total transmission probability in a specific time within the social network, and the method for calculating the total transmission probability within the social network based on timing comprising:
    performing a path probability calculating step to calculate a plurality of time-path probability matrices from the social network according to a PageRank algorithm;
    performing a first binary-addition tree searching step to enumerate a plurality of feasible spread vectors of the social network and a plurality of 1-lag temporal vectors corresponding to the feasible spread vectors according to a multi-state binary-addition tree searching method;
    performing a second binary-addition tree searching step to enumerate a plurality of time-slot vectors of each of the 1-lag temporal vectors according to the multi-state binary-addition tree searching method; and
    performing a transmission probability calculating step to calculate the total transmission probability of the social network within the specific time according to the time-path probability matrices and the time-slot vectors;
    wherein the time-path probability matrices are corresponding to a plurality of time values, and the time values are in the specific time and different from each other.

2. The method for calculating the total transmission probability within the social network based on timing of claim 1, wherein the social network comprises:
    the nodes comprising the source node, wherein each of the nodes comprises a degree; and a plurality of paths, wherein each of the paths is connected to two of the nodes;

wherein the degree of each of the nodes is a number of the paths connected to each of the nodes, and the social network is a scale-free network.

3. The method for calculating the total transmission probability within the social network based on timing of claim 2, wherein the path probability calculating step comprises:

performing an adjacency node counting step to count the paths connected to the nodes and generate an adjacency matrix of each of the nodes;

performing a ranking value calculating step to calculate a ranking value of each of the nodes according to the PageRank algorithm, the degree and a damping factor; and performing a path probability generating step to generate the time-path probability matrices according to the ranking value of each of the nodes and an adjacency node set of each of the nodes;

wherein the adjacency node set of each of the nodes is transformed from the adjacency matrix.

4. The method for calculating the total transmission probability within the social network based on timing of claim 3, wherein, each of the feasible spread vectors comprises a plurality of the adjacency node sets corresponding to the nodes; and each of the 1-lag temporal vectors is one of the time values corresponding to each of the feasible spread vectors;

wherein each of the feasible spread vectors and the 1-lag temporal vectors has a state vector corresponded thereto.

5. The method for calculating the total transmission probability within the social network based on timing of claim 4, wherein the total transmission probability reduces as the time value increases.

6. A system for calculating a total transmission probability within a social network based on timing, which is configured to put a message to a source node of a plurality of nodes in the social network and calculate the total transmission probability in a specific time within the social network, and the system for calculating the total transmission probability within the social network based on timing comprising:

a memory accessing the social network and a multi-state binary-addition tree searching method; and a processor electrically connected to the memory, wherein the processor is configured to implement a method for calculating the total transmission probability within the social network based on timing comprising:

performing a path probability calculating step to calculate a plurality of time-path probability matrices from the social network according to a PageRank algorithm;

performing a first binary-addition tree searching step to enumerate a plurality of feasible spread vectors of the social network and a plurality of 1-lag temporal vectors corresponding to the feasible spread vectors according to the multi-state binary-addition tree searching method;

performing a second binary-addition tree searching step to enumerate a plurality of time-slot vectors of each of the 1-lag temporal vectors according to the multi-state binary-addition tree searching method; and performing a transmission probability calculating step to calculate the total transmission probability of the social network within the specific time according to the time-path probability matrices and the time-slot vectors;

wherein the time-path probability matrices are corresponding to a plurality of time values, and the time values are in the specific time and different from each other.

7. The system for calculating the total transmission probability within the social network based on timing of claim 6, wherein the social network comprises:

the nodes comprising the source node, wherein each of the nodes comprises a degree; and a plurality of paths, wherein each of the paths is connected to two of the nodes;

wherein the degree of each of the nodes is a number of the paths connected to each of the nodes, and the social network is a scale-free network.

8. The system for calculating the total transmission probability within the social network based on timing of claim 7, wherein the path probability calculating step comprises:

performing an adjacency node counting step to count the paths connected to the nodes and generate an adjacency matrix of each of the nodes;

performing a ranking value calculating step to calculate a ranking value of each of the nodes according to the PageRank algorithm, the degree and a damping factor; and performing a path probability generating step to generate the time-path probability matrices according to the ranking value of each of the nodes and an adjacency node set of each of the nodes;

wherein the adjacency node set of each of the nodes is transformed from the adjacency matrix.

9. The system for calculating the total transmission probability within the social network based on timing of claim 8, wherein, each of the feasible spread vectors comprises a plurality of the adjacency node sets corresponding to the nodes; and each of the 1-lag temporal vectors is one of the time values corresponding to each of the feasible spread vectors;

wherein each of the feasible spread vectors and the 1-lag temporal vectors has a state vector corresponded thereto.

10. The system for calculating the total transmission probability within the social network based on timing of claim 9, wherein the total transmission probability reduces as the time value increases.

\* \* \* \* \*